United States Patent [19]
Pausch

[11] Patent Number: 5,782,024
[45] Date of Patent: Jul. 21, 1998

[54] METALLIC DATA CARRIER

[76] Inventor: Rudolf Pausch, Luisenstrasse 39, D-75172 Pforzheim, Germany

[21] Appl. No.: 592,431
[22] PCT Filed: Jul. 26, 1994
[86] PCT No.: PCT/EP94/02459
  § 371 Date: Feb. 2, 1996
  § 102(e) Date: Feb. 2, 1996
[87] PCT Pub. No.: WO95/04342
  PCT Pub. Date: Feb. 9, 1995

[30] Foreign Application Priority Data

Aug. 2, 1993 [DE] Germany .......................... 43 25 918.9

[51] Int. Cl.$^6$ ................................................ G09F 3/00
[52] U.S. Cl. ................................ 40/330; 40/514; 70/408
[58] Field of Search ........................ 40/330, 514, 515, 40/517, 116; 70/408, 395, 460; D3/208, 210; D8/347, 348

[56] References Cited

U.S. PATENT DOCUMENTS

D. 271,279  11/1983  Cziment ........................ D8/347
D. 279,459  7/1985  On ............................... D3/210
768,420  8/1904  Breckle ......................... 40/517

FOREIGN PATENT DOCUMENTS 481545  3/1938  United Kingdom ............... 70/408

*Primary Examiner*—Cassandra Davis
*Attorney, Agent, or Firm*—Antonelli, Terry, Stout, & Kraus, LLP

[57] ABSTRACT

In a data carrier (10) suitable for always taking along with oneself, personal data of the user such as name, date of birth, blood group, size, particular traits such as permanent medication needs, allergies or the like, are recorded on a spring steel strip (11) that may be wound into a flat, can-like case (12) like that of a measuring tape. The letters and numbers of which the information (14) recorded on the spring steel strip (11) is composed are cut into the strip as recesses with the contour of the letters and numbers by a laser cutting process. The case (12) may be designed as the head of the ignition key of a vehicle, the key bit (23) being fixedly inserted into a block-like extension (22) of the case (12).

6 Claims, 1 Drawing Sheet

METALLIC DATA CARRIER

FIELD OF THE INVENTION

The invention relates to a data carrier of metal for personal data, such as name, birthday, blood group, height, weight, or other personal characteristics, which is insensitive to mechanical damage as well as high temperatures and also to aggressive gases or liquids.

BACKGROUND AND SUMMARY OF THE INVENTION

Data carriers of this kind are made in the form of metal plaques which are either fitted into a metal bracelet or made as part of a neck chain, in other words are worn directly on the body, generally known, and contain data embossed in cleartext, knowledge of which in the event of an accident in which the wearer is unconscious, is of maximum interest for rapid assistance, for example the blood group and an address or a telephone number where further information about the injured person can be obtained.

A data carrier of this kind is also the identification mark conventionally used in the military.

A disadvantage of known data carriers of this type is the small amount of data that can be printed legibly on a plaque in embossed form. Therefore, the identification information and for example the blood group can be "reported" by the known data carriers but not detailed information that could be significant for expert "first" aid in the event of a serious accident, for example contraindications for certain medications, the existence of certain diseases, for example diabetes or other preexisting conditions that require chronic medication with special drugs, detailed information about insurance protection and/or telephone numbers at which more information can be reliably obtained.

Hence the goal of the invention is to improve a data carrier of the species recited at the outset in such fashion that, while it has an equally space-saving design, permits the storage of a large volume of information of the type described in a readily legible form.

This goal is achieved according to the invention by virtue of the fact that the data carrier is in the form of a spring steel band wound up in a spiral in the manner of a steel measuring tape in a flat housing that likewise consists of a resistant metal, with the data on the user being legibly embossed in cleartext on the steel band or stored in the form of recesses in the shape of letters and numbers on the spring steel band and the steel band can be pulled out of a slot in the housing. The data carrier according to the invention, by virtue of this design, offers at least the following advantages:

The surface available for displaying information, a line, is many times greater than in known data carrier of this species recited at the outset, so that a correspondingly large quantity of data can be stored on the data carrier according to the invention. As examples, in addition to the name and blood group, the following could be mentioned:

An emergency telephone number, membership number in a social service organization from which important personal data could be called up, height, weight, special diseases, for example diabetes, that require certain precautions when administering first aid, telephone numbers and/or address of next of kin, telephone number of the personal physician, need for chronic medication, and the like.

In order to be able to display all this information on the spring steel band of the data carrier according to the invention, it is sufficient as a rule if this carrier, as provided in the preferred design has a width of approximately 5 mm and a thickness of 0.1 mm, has a length of 50 cm to 200 cm, whereby a length of about 1 m will be sufficient in general.

The data carrier according to the invention can be made in the form of a pendant on a neck chain or as a flat capsule on a bracelet, which are clearly recognizable as data carriers and can be worn permanently by the user.

In a preferred embodiment, the data carrier according to the invention is made in the form of a key ring, preferably as a ring for the ignition key used by the driver himself for his motor vehicle, since as a rule it is sufficient for the data to be carried along when a situation of potential risk exists. In the design as a key ring, the data carrier can in any event be carried along conveniently in other situations as well.

In the event that the data carrier is made in a form in which it can be carried not only by the user who is described by the data, it is essential that the data carrier include as "distinguishing information" the birthday, height, and possibly information about special characteristics in order to make sure that the information that can be obtained from the data carrier also "fits" the person carrying the data carrier.

One especially advantageous form of the data carrier can also consist in it being in the form of a bow of a vehicle ignition key, used exclusively by the user.

Another advantageous arrangement of the data carrier can be on the steering wheel of a vehicle owned by the user, or on the handle of the shift lever of the vehicle transmission.

In a preferred embodiment of the data carrier, the information recorded on it is produced by a laser cutting method in such fashion that the spring steel band has letters and numbers in the form of recesses so that the information can be read very easily when the band is held up to the light. The "cutting out" of the word and number information also has the advantage that in contrast to embossing, no thickness results that would contribute to adversely affecting the ease with which the band can be pulled out and would also result in an increase in the diameter of the band. The radial outer and inner limiting surfaces of the steel band remain smooth, so that even with the largest possible band lengths, with the individual band turns abutting one another directly, the band winding diameter can be kept relatively small.

The housing of the data carrier is advantageously made in the shape of a flat box with a plate-shaped lid that matches the basic shape, said lid fitting externally flush against the jacket wall of the box and being lockable to it either by a locking connection or by screws, with the screws for this purpose being screwable into a threaded piece of the flat-pot-shaped box part that projects radially slightly inward.

The housing parts with this design can be manufactured economically from diecast parts from a metal whose melting point should be as high as possible so that the housing does not melt for example in the case of a fire in the vehicle.

It is especially advantageous in this regard for a central pin by which the spring steel band is attached at its end inside the housing be located on the removable lid of the housing so that replacement of the steel band and/or the addition of additional data to it is facilitated.

Further details and features of the data carrier according to the invention will follow from the following description of a preferred embodiment with reference to the drawing.

DETAILED DESCRIPTION OF DISCLOSED EMBODIMENT

Figure 1:
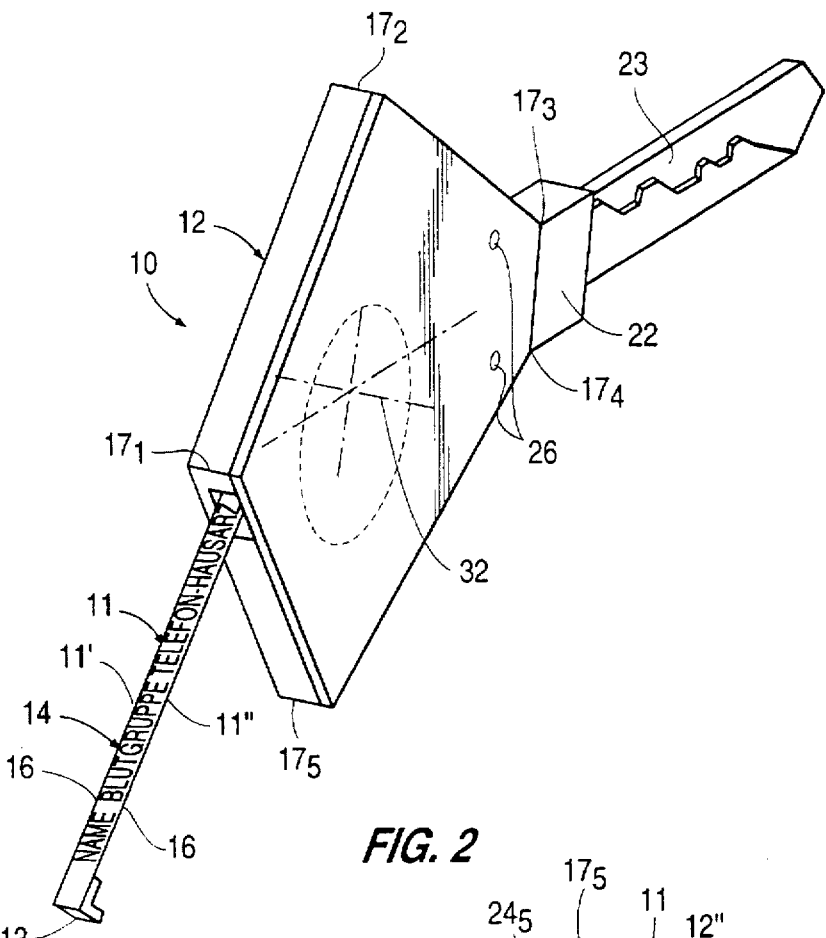
FIG. 1 shows a data carrier according to the invention shaped as the bow of an ignition key, in a schematically simplified, enlarged, perspective view.

The purpose of the data carrier represented in FIG. 1 as a whole by 10 is the storage, as safely as possible, of a plurality of information items that relate to the user of data carrier 10 and knowledge of which, for example in an accident suffered by the user, is advantageous for rapid medical assistance to the individual requiring help. Important information of this kind includes in particular the blood group of the user, age, height and weight, information about diseases for which the user needs chronic medication, or because of which contraindications for certain medications could exist and must not be given to the user, as well as information that permits the user to be identified such as name, address, telephone numbers of relatives and also telephone numbers of social service organizations in which data is stored about the user, which could be called up in a short time in order to provide a "picture" of the user that is as complete as possible, especially the largest possible amount of information about his total medical history, prompt knowledge of which is useful both for first aid treatment and for subsequent treatment in a hospital.

The data carrier 10 consists of a recording medium in the form of a spring steel band 11 and a housing that is in the form of a flat box, represented as a whole by 12, that receives this data carrier, said housing receiving the recording medium 11 in the form of a spiral-shaped automatically winding steel measuring tape. At its free end the spring steel band 11 is provided with a stop 13 bent at an angle which prevents spring steel band 11 from being pulled all the way into housing 12 and simultaneously can be used as a grip to pull the recording medium 11 out.

Spring steel band 11 is assumed in the embodiment shown to have a thickness of 0.1 mm, a width of 4 mm, and a pullout length of about 1 m.

The information relating to the user is stored on recording medium 11 (in cleartext) by virtue of the fact that the letters and numbers required for the purpose are cut out by a laser cutting method as suitably shaped recesses. The narrow ribs 16 that remain between the edges and the sequence of letters and numbers, the "information" 14 and the lengthwise edges 11' and 11" of the band, which lend spring steel band 11 sufficient stability and sufficient elastic restoring force, that makes it possible for it to wind up automatically to pull the band into housing 12, have a width of about 0.6 mm, so that a remaining width of about 2.8 mm remains to accommodate the letter and number characters of the information 14, which is sufficient to make the information easily readable, at least when the band is held up against a bright background.

Figure 2:
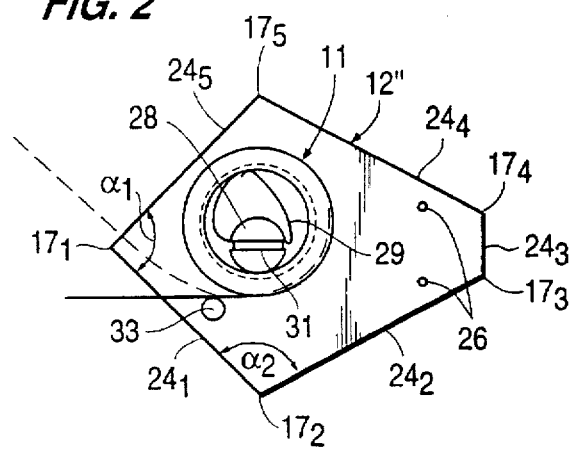
FIG. 2 shows the lid of the housing of the data carrier according to FIG. 1, viewed from its interior, on a scale of 1.2:1.
Figure 3:
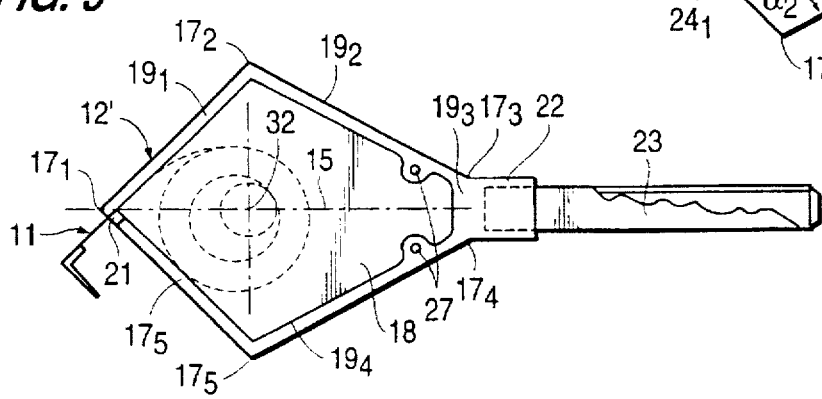
FIG. 3 shows the housing part of the data carrier according to 1 forming the key bow with the lid removed, in a top view on a scale of 1.2:1.

In the special embodiment shown, housing 12 has the basic shape of an irregular pentagon which however is symmetrical relative to its lengthwise center line 15. Housing 12 consists of the housing part 12' in the form of a flat box and an essentially plate-shaped lid part 12", which are shown in detail in FIGS. 2 and 3.

The housing 12 includes corners $17_1$ to $17_5$ jacket wall parts $19_1$ to $19_5$ of the housing jacket project substantially perpendicularly from bottom 18 of the box-shaped housing part 12'. The corner $17_1$ through which line of symmetry 15 runs, encloses an angle $\alpha_1$ of approximately 90° each of the corners $17_2$ and $17_5$ adjacent to corner $17_1$, an angle $\alpha_2$ of approximately 108° is formed, which corresponds to the internal angle of the regular pentagon.

Pull-out slot 21 through which spring steel band 11 can be pulled out of housing 12 is located on the corner $17_1$ of box-shaped housing part 12' at which the two jacket sections $19_1$ and $19_5$ of the housing jacket, leaving slot 21, "abut" one another. The jacket sections $19_2$ and $19_4$ abutting these two jacket wall sections $19_1$ and $19_5$ at corners $17_2$ and $17_5$ are slightly longer so that, as seen in a top view, an approximately "kite-shaped" outside contour of housing 12 results.

On the side of housing 12 that is opposite pullout slot 21, its box-shaped housing part 12' has an extension block 22 that is square when seen in a top view in which the blade 23 of an ignition key is permanently mounted, whose bow is formed by data carrier 10. This design of data carrier 10 ensures that the user carries data carrier 10 with him when he drives his vehicle.

In order to ensure this, it is also possible to integrate data carrier 10 into the handle of a shift lever of the vehicle or into the hub of the steering wheel.

In the embodiment shown, lid 12" is designed as a flat plate whose marginal edges $24_1$ to $24_5$, with the housing 12 in the assembled state, fit flush with the outer limiting surfaces of jacket wall sections $19_1$ to $19_5$ of the box-shaped housing part 12' with lid 12" fitting tightly against the free end faces of jacket wall sections $19_1$ to $19_5$ of the box-shaped housing part 12' and which forms a lateral limit to pullout slot 21. To secure lid 12" to the box-shaped housing part 12' screws are provided, projecting through openings 26 in lid part 12" and with their heads sinkable into these openings, said screws being screwable into threads that are provided on threaded blocks 27 that are located on the insides of the longer jacket wall sections $19_2$ and $19_4$.

A central pin 28, to which the one (inner) end 29 of spring steel band 11, projecting through a radial slot 31 of pin 29, is attached to the housing, in the embodiment shown is located on lid 12" of housing 12, so that when lid 12" is removed from box-shaped housing part 12', spring steel band 11 can also be removed from housing 12.

Central axis 32 of pin 28 runs in the embodiment shown through the intersection of lengthwise center line 15 with the connecting line of corners $17_2$ and $17_5$, from which the jacket wall sections $19_1$ and $19_5$ pointing toward pullout slot 21 depart. In addition, lid part 12" is provided with a counterbearing pin 33 located at a radial distance from central pin 28, on which pin 33 the pullout side end of spring steel band 11 is radially supportable, thus preventing the spring steel band from unrolling when lid part 12" is removed.

Of course housing 12, in contrast to the special embodiment explained, could also have a basic shape that was a higher polygon or even circular, which would be advantageous in particular when using the data carrier in the motor vehicle area.

I claim:

1. Data carrier made of metal having personal data of a user carrying the data carrier, with the data carrier being largely insensitive to high thermal stresses as well as mechanical influences in order to maintain the data which it carriers, said data carrier comprising a resistant metal housing, a spring steel band that can be automatically wound up in a spiral configuration in said housing and can be pulled out of a slot in said housing to an unwound configuration, on said band said personal data is embossed legibly in cleartext or applied by recesses that have the contour of conventional characters, and wherein said housing is a bow of a vehicle ignition key.

2. Data carrier according to claim 1, wherein said spring steel band has a length between 0.5 m and 2 m, a width between 3 mm and 5 mm, and a thickness between 0.08 and 0.12 mm.

3. Data carrier according to claim 1, wherein said characters of said personal data are cut out by a laser cutting method from said spring steel band.

4. Data carrier according to claim 1, wherein said housing comprises a housing part in a form of a flat box and a lid part in a form of a flat plate, said lid part being fastened releasable to a housing part by one of a latching connection and screw connection.

5. Data carrier according to claim 1, wherein the housing parts of said data carrier are made as diecast metal parts.

6. Data carrier according to claim 4, wherein a central pin, to which an inner end of said spring steel band is releasably attached, with said spring steel band surrounding said pin in a form of a spiral, is mounted on said lid of housing.

* * * * *